United States Patent
Strijkers et al.

(10) Patent No.: US 10,951,716 B2
(45) Date of Patent: Mar. 16, 2021

(54) REDIRECTING A CLIENT DEVICE FROM A FIRST GATEWAY TO A SECOND GATEWAY FOR ACCESSING A NETWORK NODE FUNCTION

(71) Applicants: Koninklijke KPN N.V., Rotterdam (NL); Nederlandse Organisatie voor toegepast-natuurwetenschappelijk onderzoek TNO, The Hague (NL)

(72) Inventors: Rudolf Strijkers, Zurich (CH); Antonius Norp, The Hague (NL)

(73) Assignees: KONINKLIJKE KPN N.V., Rotterdam (NL); NEDERLANDSE ORGANISATIE VOOR TOEGEPAST-NATUURWETENSCHAPPELIJK ONDERZOEK TNO, 'S-Gravenhage (NL)

( * ) Notice: Subject to any disclaimer, the term of this patent is extended or adjusted under 35 U.S.C. 154(b) by 0 days.

(21) Appl. No.: 14/777,895

(22) PCT Filed: Mar. 17, 2014

(86) PCT No.: PCT/EP2014/055239
§ 371 (c)(1),
(2) Date: Sep. 17, 2015

(87) PCT Pub. No.: WO2014/146999
PCT Pub. Date: Sep. 25, 2014

(65) Prior Publication Data
US 2016/0301762 A1    Oct. 13, 2016

(30) Foreign Application Priority Data
Mar. 18, 2013    (EP) ..................................... 13159734

(51) Int. Cl.
*H04L 29/08* (2006.01)
*H04W 8/08* (2009.01)

(52) U.S. Cl.
CPC ............ *H04L 67/16* (2013.01); *H04L 67/322* (2013.01); *H04L 67/327* (2013.01); *H04W 8/082* (2013.01); *H04L 67/289* (2013.01); *H04L 67/34* (2013.01)

(58) Field of Classification Search
CPC ..................................................... H04L 67/322
See application file for complete search history.

(56) References Cited

U.S. PATENT DOCUMENTS 8,244,874 B1    8/2012    Thireault
8,406,170 B2    3/2013    Rune
(Continued)

FOREIGN PATENT DOCUMENTS

WO    WO 2010/098960    9/2010
WO    WO 2011/020624    2/2011

OTHER PUBLICATIONS

Konstantinos, S., et al., "Traffic Offload Enhancements for eUTRAN," IEEE Communications Surveys, IEEE, vol. 14, No. 3, pp. 884-896, Jul. 1, 2012.
(Continued)

*Primary Examiner* — Kevin M Cunningham
(74) *Attorney, Agent, or Firm* — Hamilton, Brook, Smith & Reynolds, P.C.

(57) ABSTRACT

The present invention enables a network operator to select a gateway that provides desirable operational parameters to access a network node function in a network node requested by a client. A network service provider detects what service
(Continued)

a client device is requesting or using and selects a gateway (e.g. PDN-GW) to deliver the service. The client device is signaled to make a new connection to the network using the selected gateway, e.g. by connecting to the APN associated with the PDN-GW that delivers the service.

10 Claims, 3 Drawing Sheets

(56) References Cited

U.S. PATENT DOCUMENTS

| | | | |
|---|---|---|---|
| 2012/0134319 A1* | 5/2012 | Kahn | H04W 8/26 370/328 |
| 2012/0182940 A1* | 7/2012 | Taleb | H04L 29/12066 370/328 |
| 2012/0196601 A1 | 8/2012 | Lundqvist et al. | |
| 2013/0051319 A1 | 2/2013 | Nakahara | |
| 2013/0223421 A1* | 8/2013 | Gundavelli | H04W 76/12 370/338 |
| 2014/0136675 A1* | 5/2014 | Yao | H04L 67/1097 709/223 |
| 2014/0161026 A1* | 6/2014 | Stojanovski | H04L 45/22 370/328 |
| 2015/0223133 A1* | 8/2015 | Stojanovski | H04W 52/0251 370/230 |

OTHER PUBLICATIONS

"3$^{rd}$ Generation Partnership Project: Technical Specification Group Services and System Aspects; Local IP Access and Selected IP Traffic Offload (LIPA-SIPTO) (Release 10)," 3GPP Standard; 3GPP TR 23.829, No. V10.0.0, Mar. 29, 2011.

"3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 11)," 3GPP Draft; 23401-B40 CRS Implemented, Dec. 18, 2012.

International Search Report, PCT/EP2014/055239, "Redirecting a Client Device from a First Gateway to a Second Gateway for Accessing a Network Node Function," dated Apr. 17, 2014.

Konstantinos Samdanis, et al., "Traffic Offload Enhancements for eUTRAN," *IEEE Communications Surveys & Tutorials*, 14(3): 884-896 (2012).

\* cited by examiner

REDIRECTING A CLIENT DEVICE FROM A FIRST GATEWAY TO A SECOND GATEWAY FOR ACCESSING A NETWORK NODE FUNCTION

This application is the U.S. National Stage of International Application No. PCT/EP2014/055239, filed Mar. 17, 2014, which designates the U.S., published in English, and claims priority under 35 U.S.C. §§ 119 or 365(c) to European Application No. 13159734.6, filed Mar. 18, 2013.

FIELD OF THE INVENTION

The present invention relates to accessing network node functions via a gateway. More specifically, the invention relates to a method of redirecting a client device from a first gateway to a second gateway for accessing a network node function remote from the client device, a service detection software function, a service gateway selection software function, a service redirection software function, a service placement software function, and a client device that is communicatively connectable to a first gateway and communicatively connectable to a second gateway for accessing a network node function remote from the client device via the second gateway.

BACKGROUND

It is known that network overhead can impact the end-to-end performance of client-server applications, especially when a single client request requires multiple calls to databases, application servers, or the client itself. The Network overhead is caused by operational parameters of the network, intermediary networks, and network elements (e.g. latency, bandwidth, hops, affinity, data processing capacity, storage, geographical distance) between the server and the client device or the network of an operator servicing the client device. The impact of network overhead may be increased when the number of networks, the number of network elements and/or the geographical distance between clients and servers increases. For example, network delay caused by the distance between a client and a server can significantly reduce the client's quality of experience when a single user request requires multiple calls to databases, application servers and/or the client. Cloud services offered to a client device are also affected by network overhead.

With cloud computing a client device uses a cloud service at a cloud service provider. A cloud service is a service that is delivered and consumed on demand at any time, through any access network, using any connected devices using cloud computing technologies. A cloud service user (CSU) is a person or organization that consumes delivered cloud services, typically using a client device. A CSU can include intermediate users that will deliver cloud services provided by a cloud service provider (CSP) to actual users of the cloud service, i.e. end users. End users can be persons, machines, or applications. Cloud computing is a model for enabling service users to have on-demand network access to a shared pool of configurable computing resources (e.g. networks, servers, storage, applications and services), that can typically be provisioned and released with minimal management effort or service-provider interaction. Cloud computing enables the cloud services. It is considered from a telecommunication perspective that users are not buying physical resources but cloud services that are enabled by cloud computing environments. Cloud infrastructure as a service (IaaS) is a category of cloud services where the capability provided by the cloud service provider to the cloud service user is to provision virtual processing, storage, intra-cloud network connectivity services (e.g. VLAN, firewall, load balancer and application acceleration), and other fundamental computing resources of the cloud infrastructure where the cloud service user is able to deploy and run arbitrary application. Inter-cloud computing allows on-demand assignment of cloud resources, including computing, storage and network, and the transfer of workload through interworking of cloud systems. From the viewpoint of a CSP, inter-cloud computing can be implemented in different manners, including inter-cloud peering, inter-cloud service broker and inter-cloud federation. These manners correspond to distinct possible roles that a CSP can play when interacting with other CSPs. Inter-cloud peering provides direct inter-connection between two CSPs. An inter-cloud service broker (ISB) provides indirect interconnection between two (or more) CSPs achieved through an interconnecting CSP which, in addition to providing interworking service functions between the interconnected CSPs, also provides brokering service functions for one (or more) of the interconnected CSPs. ISB also covers the case in which one (or more) of the interconnected entities receiving the brokering service is a cloud service user (CSU). Brokering service functions generally includes but is not limited to, the following three categories: service intermediation, service aggregation and service arbitrage. Inter-cloud federation is a manner to implement inter-cloud computing in which mutually trusted clouds logically join together by integrating their resources. Inter-cloud federation allows a CSP to dynamically outsource resources to other CSPs in response to demand variations.

A mobile cloud is a model in which mobile applications (i.e. application for mobile devices) are built, powered and hosted using cloud computing technology. The client device may acts as the on-device gateway, which enables the user to access the information stored and processed within the cloud. Mobile cloud applications can send processing or storage tasks to servers located in a cloud, receive, and display the results and use cloud resources to store data or to execute functions normally performed by the client device (e.g. pre-process web pages for optimal display on a mobile device, transcoding, storing application data). Mobile cloud applications can be downloaded on the client device or directly accessed via the web browser (e.g. using HTML5 and Javascript) and make use of client device capabilities and sensors, such as camera's, GPS, or microphone to deliver a service.

The mobile cloud application provider typically cannot control the network between the cloud server and the client device, though communication between client devices and cloud servers requires broadband connectivity. Moreover, streaming media or gaming applications may require network connectivity within certain latency and jitter bounds. With the increasing need for faster networks to support new and more demanding applications, network service providers typically increase network capacity to meet demands. Other options, such as prioritizing traffic require advanced network management and only improve the quality of service within the network service provider's boundaries. But congestion, delay, errors, and failures outside the network service provider's boundaries may still negatively impact application performance.

Intercloud computing enables end-users to create and transfer servers over a multitude of Cloud Service Providers (CSP). This ability allows end-users to implement three functions: load balancing, cloud bursting and fail-over. In a load balancing setup, servers are copied over multiple cloud server providers. A proxy server distributes client requests over the servers. Cloud bursting enables a server to distribute workload over multiple cloud service providers if local resources are insufficient to handle the workload. Load balancing can be used to distribute client requests, but the servers may also handle part of the workload to process client requests. End-users can also implement fail-over mechanisms when servers can be distributed over multiple resource providers.

An Intercloud service broker adds the capability to intermediate, aggregate and arbitrate between cloud service providers. Depending on application requirements (e.g. location, pricing, resources) the Intercloud service broker provides functionality to match cloud resource buyers (e.g. end-users, cloud service provider or reseller) to cloud resource sellers (e.g. cloud service provider or reseller). The goal is to provide the best possible match between offered and required resources to run a server and to abstract individual cloud service providers into a single entry-point for cloud services. An Intercloud service broker is required to provide end-users the capability for implementing load balancing, cloud bursting, and fail-over in the Intercloud.

Cloud service brokers can be used to match server requirements (e.g. price, CPU, memory, location) to cloud locations. Cloud service brokers have no notion of the network between clients and servers and do not model network context specific details of client devices either. Therefore, cloud service brokers do not significantly reduce the overhead of induced by traversing the network service provider's network(s), which negatively impacts client-server communication (e.g. network latency, propagation delay, buffering/queuing in network devices, errors, failures).

Recent developments in the 3GPP standard for mobile communication relate to Long Term Evolution (LTE) networks and devices. LTE, also known as 4G (i.e. fourth generation) mobile communications standard, is a standard for wireless communication of high-speed data for mobile phones and data terminals. It is a successor of GSM/EDGE (also known as 2G or 2.5G) and UMTS/HSPA (also known as 3G) network technologies, increasing the capacity and speed using a different radio interface together with core network improvements.

User equipment (UE) is any device used directly by an end-user to communicate. It can be a hand-held telephone, a laptop computer equipped with a mobile broadband adapter, or any other device. The terms 'UE', 'terminal' and 'client device' are synonyms.

Client devices, such as mobile terminals in a mobile network, typically connect to an Internet gateway by requesting a connection to an Access Point Name (APN), which establishes a tunnel to a Packet Data Network (PDN) gateway that provides the actual IP services such as addressing and Internet gateway functionality. Alternatively, a (home) router or H(e)NodeB (i.e. LTE base station) in the network service provider's network can function as Internet gateway. Depending on the location in the network service provider's network, traffic over the Internet gateway is routed over the backhaul (i.e. the network connecting the base station or (home) router to the core network) to the core network before being routed to the Internet.

In known 3GPP proposals the H(e)NodeB's can be configured to redirect data traffic to local devices through a local area network or to redirect traffic through the network of another Internet service provider. An example of such proposal can be found in 3GPP specification TR 23.829 Release 10 entitled "Local IP Access and Selected IP Traffic Offload (LIPA/SIPTO)". The goal of LIPA/SIPTO is to avoid congestion in the backhaul or core network by redirecting traffic over an available fixed broadband network, and to support IP communication with local devices, such as a home printer or media center. A client device is connected to the Internet through an H(e)NodeB, (Home) router or PDN-gateway as the Internet gateway. The Internet gateway which supports packet filtering and redirection of traffic through network address translation or other mechanisms.

From the 3GPP TS23.401 standard the structure and components of the Evolved Packet Core (EPC) including scenarios in which PDN-GW selection and connection is done are known. Herein the PDN is an IP network providing IP connectivity. An important task of the EPC is to provide IP connectivity to a mobile terminal for both data and voice services, which is achieved by connecting to a PDN identified by an APN when mobile terminal performs an attach procedure. When a user gets a subscription to e.g. enhanced packet services (EPS) on a LTE mobile network, the operator typically configures the mobile terminal with appropriate service identifier (i.e. APN) for connection to the network. Alternatively, the end-user manually configures the mobile terminal with service identifiers it has obtained from the mobile operator, e.g. via a web page or mail.

The operator may provide access to different PDNs with different services. One PDN could, for example, be the public Internet. If the user establishes a PDN connection to this 'Internet PDN', the user can browse websites on the Internet, connect to a cloud service provider on the internet or access other services available on the Internet. Another PDN could be a specific IP network set up by the telecom operator to provide operator specific services, for example based on IP Multimedia Subsystem (IMS). Another PDN could be a corporate IP network.

When the user establishes a PDN connection to a specific PDN, only access to the services provided on that PDN are provided.

A terminal may access a single PDN at a time or it may have multiple PDN connections open simultaneously, for example to access the Internet and the IMS services simultaneously if those services happen to be deployed on different PDNs. In the latter case, the terminal typically has multiple IP addresses, one (or two if both IPv4 and IPv6 are used) for each PDN connection. Each PDN connection represents a unique IP connection, with its own IP address (or pair of IPv4 address and IPv6 prefix)

The PDN-GW serves two roles in the LTE system architecture: providing connectivity to external networks and acting as the anchor between 3GPP and non-3GPP technologies. In addition, the operator can provide specific IP services through the PDN-GW. Mobile terminals may support multiple PDN-GW connections, such that a differentiation can be made between and the IP services of PDN-GWs.

Current practice is that PDN-GW connections are limited to a small number of PDN-GWs and that PDN-GW connections are UE-driven (i.e. the UE triggers a connection request to a specific packet service e.g. by the end-user). Consequently, the operator is practically unable to make new or better services available to terminals via the available PDN-GW selection mechanisms.

In current practice of network operations, a PDN-GW is considered an anchor point for packet services. The aim is to remain connected to the selected PDN-GW in case of hand-over and roaming. Consequently, a network service provider offers a limited number of PDN-GWs, centralized at key locations, to serve subscribers.

There are cases, however, in which centralized or default PDN-GWs are insufficient. Some services may rely on high-speed data rates or require low network latency. It may not be possible to meet the service requirements due to limitations in the access technologies (e.g. not enough capacity, congestion) to the PDN-GW or due to the geographical distance between the PDN-GW and the UE. Also, routing via a centralized PDN-GW may lead to inefficient routing (tromboning) within the network if e.g. the service function is local to the UE but the centralized PDN-GW is far away. Selection of a specific PDN-GW depending on the selected service that could be crucial for service delivery and for the perceived quality of experience by the UE is not possible.

APNs and associated PDN-GWs may be arranged to deliver localized services (e.g. local networks provided by LIPA/SIPTO), application-specific services (e.g. specialized storage network, accelerated web, content delivery or cloud services), or online optimization and reordering of PDN-GW connections (i.e. when traffic from UEs may exceed a PDN-GWs capacity). A problem is that UEs have no knowledge about the localized services, application-specific services or PDN-GWs capacity, which may also be subject to change after a (default) PDN-GW connection is made. Therefore, UEs cannot trigger a connection request to a PDN-GW that may provide additional or better services than the PDN-GWs known on beforehand (e.g. configured in the UE, handed to the UE, or provisioned through some other means).

There is a need for a solution that overcomes the above identified problems and more specifically enables the network operator to select of a gateway that provides desirable operational parameters to access a service requested by a client.

SUMMARY OF THE INVENTION

The present invention enables a network operator to select a gateway that provides desirable operational parameters to access a network node function requested by a client.

According to an aspect of the invention a method of redirecting a client device from a first gateway to a second gateway is proposed for accessing a network node function remote from the client device. The client device can be communicatively connected to the first gateway. The client device can be communicatively connectable to the second gateway. The second gateway can be communicatively connectable to the network node function. The method can comprise intercepting a data signal transmitted from the client device via the first gateway. The data signal can comprise data for using the network node function. The method can further comprise analyzing the data to determine the network node function and obtain an analysis result comprising an indication of the network node function. The method can further comprise selecting a reference to the second gateway based on the analysis result and generating configuration data comprising the reference. The method can further comprise transmitting the configuration data to the client device to configure the client device to transmit further data for using the network node function via the second gateway.

The invention thus enables selection of a gateway that has desirable operational parameters for accessing a network node function, which network node function is operative in a network node. The selected gateway (i.e. the second gateway) typically provides desirable operational parameters (e.g. latency, bandwidth, hops, affinity, data processing capacity, storage) in relation to the client device or to the network of an operator servicing the client device, which are better than the operational parameters of the first gateway. The selection of the second gateway may be based on predefined policies.

The Internet gateway is e.g. a (home) router, PDN-GW or H(e)NodeB.

The network node function may be operative in any network node. The network node where the network node function is operative may be the same when accessing the network node function via the first gateway or via the second gateway. It is possible that the network node function is operative on different network nodes when the network node function is accessed via different gateways.

Examples of network nodes are servers, routers, and switches. Examples of network node functions are (parts of) application or network services. Application services are e.g. a web server, a HTTP proxy, database, web service (e.g. REST, SOAP), data stores, or content cache (e.g. CDN service). Examples of network services are Internet Gateways, DHCP servers, firewalls, network element functions (e.g. HSS, MME, PDN-GW), network control/signaling functions (e.g. IMS control functions, packet forwarding, path computation), and protocol implementations (OSPF, BGP, IPv4, IPv6).

A network node may provide facilities, e.g. a hypervisor, to virtualize resources. Multiple network nodes may be organized in a cloud network or cloud service provider that provides access to a pool of resources. A network node function may then be implemented as part of a virtual machine (or other abstractions offered to access virtualized resources, e.g. virtualized switch, router) or multiple network node functions may be combined into a single virtual machine.

In an embodiment the analyzing can comprise one or more of: determining of a network layer protocol; determining of an application layer protocol; and a deep packet inspection wherein binary patterns in the data are compared with predefined binary patterns associated with the network node function.

This enables various analyzing possibilities at various levels of the protocol stack.

In an embodiment the selecting can be further based on one or more properties of the client device.

This enables use of device properties, such as cell location, policies and/or subscriber information, in the selection of the gateway.

In an embodiment the intercepting and analyzing can be performed by a service detection function. The selecting can be performed by a service gateway selection function. The transmitting of the configuration data to the client device can be performed by a service redirection function. The service detection function, the service gateway selection function and the service redirection function can be computer implemented software functions in a single network node or in one or more physically separated and communicatively connected network nodes.

This enables parts of the method to be performed by specific software functions.

In an embodiment the method can further comprise transmitting the analysis result to a service placement function. The service placement function can be a computer implemented software function in a first network node of a provider of the network node function. The method can further comprise enabling access to the network node function based on the analysis result by the service placement function.

The service placement function may be used to select, allocate, and/or configure resources in relation to the (operator's) network, the UE, and/or possibly other properties, such as resource availability, security, and policies, including network control/signaling (MPLS, SDN, IMS). The service placement function may update the relevant data structures to reference the new service in case these data structures do not exist or are not up to date.

In an embodiment the enabling of the access can comprise transmitting the reference from the service placement function to the service gateway selection function.

This enables the service placement function to be configured with the reference in case of e.g. missing or not up to date data.

In an embodiment the enabling of the access can comprise loading and/or executing of the network node function on a second network node.

This makes the network node function available in the second network node in case it was not present in the second network node.

It is possible that the first network node and the second network node are one and the same.

In an embodiment the second gateway can be a packet data network gateway in a mobile network and the reference is an access point name. Alternatively the second gateway can be an access point in a wireless local network and the reference is a service set identifier.

This enables gateway selection in mobile telecommunication networks and/or WiFi networks for accessing network node functions in mobile telecommunication networks and/or WiFi networks.

According to an aspect of the invention a service detection software function is proposed, which, when being executed by a processor, is operative for the intercepting and the analyzing in the method as described above.

According to an aspect of the invention a service gateway selection software function is proposed, which, when being executed by a processor, is operative for the selecting in the method as described above.

According to an aspect of the invention a service redirection software function is proposed, which, when being executed by a processor, is operative for the transmitting of the configuration data to the client device in the method as described above.

According to an aspect of the invention a service placement software function is proposed, which, when being executed by a processor, is operative for the enabling of the access to the network node function in the method as described above.

According to an aspect of the invention a client device is proposed that is communicatively connectable to a first gateway and communicatively connectable to a second gateway for accessing a network node function remote from the client device via the second gateway. The client device can be configured to transmit a data signal via the first gateway. The data signal can comprise data for using the network node function. The client device can further be configured to, in response, receive configuration data and transmit further data for using the network node function to the second gateway. The configuration data can be generated and transmitted to the client device according to the method as described above.

Hereinafter, embodiments of the invention will be described in further detail. It should be appreciated, however, that these embodiments may not be construed as limiting the scope of protection for the present invention.

BRIEF DESCRIPTION OF THE DRAWINGS

Aspects of the invention will be explained in greater detail by reference to exemplary embodiments shown in the drawings, in which.

DETAILED DESCRIPTION OF THE DRAWINGS

Figure 1:
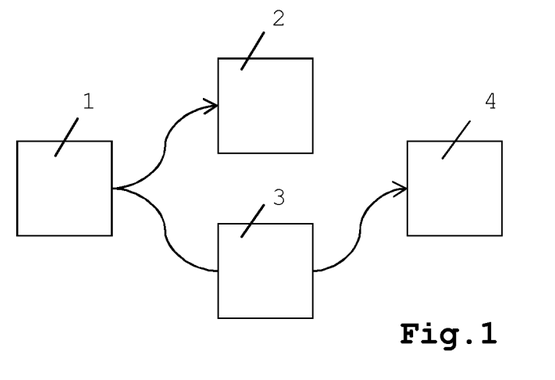
FIG. 1 shows a simplified network architecture of an exemplary embodiment of the invention.

With reference to FIG. 1, the present invention enables a client device 1 to use a second gateway 3 to deliver or connect to a service, wherein the second gateway 3 is different from a current or default first gateway 2 to which the client device 1 is connected. The service may be any network node function 4 provided by any network node. The network node where the network node function 4 is operative may be the same when accessing the network node function 4 via the first gateway 2 or via the second gateway 3. It is possible that the network node function 4 is operative on different network nodes when the network node function 4 is accessed via different gateways 2,3.

A network node function is for example a server function provided by a server or by cloud service provider or a router function. A network service provider may detect what service a client device 1 is requesting or using and may select a gateway 3 (e.g. PDN-GW) to deliver the service. The client device 1 may be signaled to make a new connection to the network using the selected gateway 3 (e.g. by connecting to the APN associated with the PDN-GW 3 that delivers the service).

Examples of network nodes are servers, routers, and switches. Examples of network node functions are (parts of) application or network services. Application services are e.g. a web server, a HTTP proxy, database, web service (e.g. REST, SOAP), data stores, or content cache (e.g. CDN service). Examples of network services are Internet Gateways, DHCP servers, firewalls, network element functions (e.g. HSS, MME, PDN-GW), network control/signaling functions (e.g. IMS control functions, packet forwarding, path computation), and protocol implementations (OSPF, BGP, IPv4, IPv6).

A network node may provide facilities, e.g. a hypervisor, to virtualize resources. Multiple network nodes may be organized in a cloud network or cloud service provider that provides access to a pool of resources. A network node function may then be implemented as part of a virtual machine (or other abstractions offered to access virtualized resources, e.g. virtualized switch, router) or multiple network node functions may be combined into a single virtual machine.

In the following examples the network nodes providing the network node functions to the client devices are related to servers. The examples are similarly applicable to other types of network nodes and network node functions, such as routers and router functions. The network nodes may be servers of any kind including servers or virtual servers at cloud service providers.

The invention provides a method to provide a UE 1 with connection configuration information (e.g. APN, SSID, and possibly other relevant data, such as filtering and routing rules) to request a new connection to a gateway 3 for a specific service. Typically, such connections are identified by an APN referencing a PDN-GW in e.g. an evolved packet core network, but the connection configuration may also include connections to other types of networks, such as WiFi. Note that an APN may point to a PDN-GW 3 that offers more than one service, so there is no strict one to one correlation between APN and PDN-GW 3. Depending on the implementation, an APN may resolve to a single PDN-GW for multiple services, a single service (e.g. one PDN-GW per service), or to multiple PDN-GWs for a single service (e.g. more than one PDN-GW that offer the same service, but at a different location for example).

Figure 2:
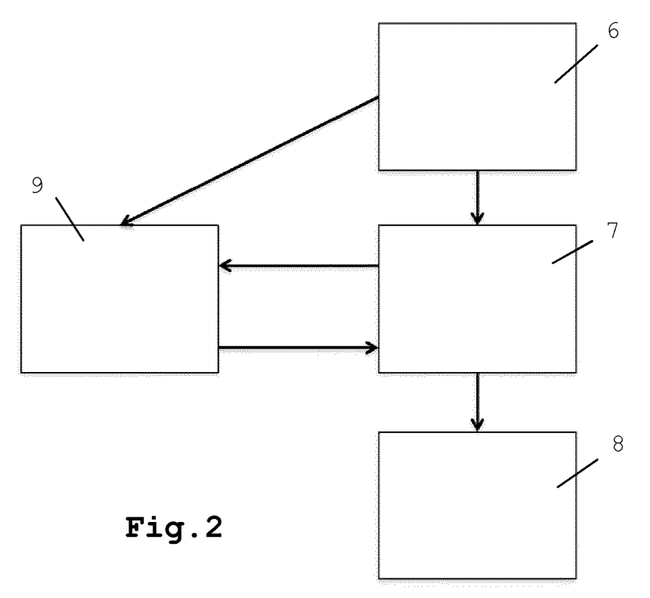
FIG. 2 shows functional components of an exemplary embodiment of the invention.

FIG. 2 show an exemplary embodiment of the invention, wherein four main functional components are shown: a Service Detection Function (SDF) 6, a Serving Gateway Selection Function (SGSF) 7, a Service Redirection Function (SRF) 8, and an optional Service Placement Function (SPF) 9.

The Service Detection Function (SDF) 6 triggers a gateway redirection. The UE 1 or the operator may initiate a gateway redirection (the APN is made known to the UE 1 before it can connect through known mechanisms) through a direct connection with the UE, or via an intermediate system the UE 1 uses to interact with a service (e.g. network device, query system, server).

The SDF 6 may make use of network traffic inspection, With network traffic inspection a network device (e.g. deep packet inspection appliance, firewall, NAT router, PDN-GW) anywhere in the traffic flow may inspect UE traffic and execute a traffic analysis function for specific patterns (e.g. DNS query, IP address range, URL). When a traffic analysis function matches a pattern associated with a service, it may send a request to the Serving Gateway Selection Function (SGSF) 7 with information about the UE 1 and matching service. For example, an indication of a UEs capability to support IPv6 may be detected when a network device receives IPv6 neighbor discovery protocol messages from the UE. SDF 6 may notify the SGSF 7 that an IPv6 gateway redirection can be made for the UE. As another example, a network device may look for specific URLs (e.g. https://storage.provider.com/bigfile.zip) in the UE traffic. The SDF 6 may then notify the SGSF 7 to find a server that is capable to handle the request more optimally (e.g. using less resources for the UE 1 or because the default PDN-GW 2 may become overloaded).

The SDF 6 may make use of network control and signalling. With network management the network service provider may use UE specific properties (e.g. cell location, policies, subscriber information) to initiate gateway redirection. For example, the UE 1 may gain access to a PDN-GW 3 and its associated services when the UE 1 is within a certain cell (e.g. defined by a (Home)eNodeB), geographical location or area (e.g. city, office), or when the UE 1 runs specific software. The network monitor 6 may notify the SGSF 7 accordingly.

The SDF 6 may make use of a DNS. The UE 1 may resolve the IP address of a service using DNS. A DNS resolver function is e.g. provided by the default PDN-GW 2 to which the UE 1 initially establishes a connection. The network service provider may listen to the DNS requests of the UE 1 for detecting a service (e.g. www.kpn.com, maps.google.com). The network service provider may implement specific formatting of the DNS name to indicate additional functions. E.g. adding the suffix '.local' to an URL as in www.kpn.com.local may indicate a request to a local PDN-GW 3 if available instead of a default PDN-GW 2. E.g. adding the suffix '.my' to an URL as in www.kpn.com.my may indicate a request to a PDN-GW 3 with a personalized specific network context to handle service requests. E.g. adding a city suffix such as '.amsterdam' to an URL as in www.kpn.com.amsterdam may indicate a request to a server and PDN-GW 3 from Amsterdam to handle service requests. E.g. adding the suffix '.wifi' to an URL as in www.kpn.com.wifi may indicate a request to a server using a WiFi network and WiFi access point 3 to handle service requests.

The server that receives a service request from a UE 1 may request the network service provider to redirect the UE 1 to another gateway (e.g. by contacting the network operator to which the UE is connected) or request the UE 1 to initiate a new gateway connection (e.g. in a HTTP response or as part of an application protocol).

The UE 1 may access the SRF 8 through a web page or server that contains a list of APNs and associated services currently available at the network service provider and select from the list the APN associated with the services it wishes to use. The UE 1 may use the information on a web portal to select a new APN or may query the APN server for the APN of a specific service.

A difference with current methods of UE triggered APN connection requests is that the PDN-GW redirection may be triggered by the SDF 6 or the server when a service is selected and that the user may not need to manually input the APN (or have knowledge of the APN). Moreover, the APN service (e.g. the web page) may present information only relevant to the UE's current context (e.g. location, subscriptions, account information). For example, a user may subscribe to a service by clicking on a description of the service (e.g. by a hyperlink). This may lead to a PDN-GW redirection on the UE 1 (e.g. a SDF 6 at an APN service sends a request to the SPSF 7) that delivers the specific service (e.g. after paying a subscription fee). Alternatively, the redirection may lead to a new connection from the UE 1 to e.g. a nearby WiFi access point 3.

Optionally, SDF 6 may send a request to the SPF 9 (e.g. when a service is detected or when the service is unavailable in the operator's network) to prepare a server and associated configurations (e.g. request the service provider to offload workload to a PDN-GW 3) and to make the server and its associated configuration known to the SGSF 7. This mechanism may be used to initiate allocation of resources and configuration of servers to optimize service requests on-demand.

The SGSF 7 selects a gateway 3 (e.g. PDN-GW or WiFi access point) and associated configuration to set up the connection to the gateway 3 (e.g. APN and routing and filtering rules), e.g. from a memory such as a database. The operator may update the database manually when a new service becomes available; optionally the SPF 9 may update the database. The SGSF 7 may notice that no suitable resource and/or gateway are available for the particular service request. In that case, the SGSF 7 may send a request to a SPF 9 to instantiate a new service on a particular resource behind a particular gateway and to do the necessary updates.

Optionally, the SGSF 7 requests a new instantiation of a service or service placement to handle a service request when no suitable (e.g. local) service is available. In this case, the SPF 9 selects, allocates, and configures resources in relation to the (operator's) network, the UE 1, and/or possibly other properties, such as resource availability, security, and policies. The SPF 9 may update the relevant data structures to reference the new service. For example, the SPF 9 may configure the infrastructure internal DNS that is used for APN resolution (which is distinct from the normal public Internet DNS) with a new APN and corresponding PDN-GW 3. The SPF 9 may also notify the SGSF 7 with the new connection configuration (e.g. APN, SSID, routing, filtering). SGSF 7 or SPF 9 may update the database with new or updated connection configurations.

The Service Redirection Function (SRF) 8 sends a request to the UE 1 with connection configuration data to create a new gateway connection (e.g. to a PDN-GW 3 or Wifi access point 3). The request may be sent through a client program or server program, session management functions of IMS and EPC, or embedded in other Internet or network control functions. For example, when the UE 1 resolves an address to access a service, the DNS server of the default PDN-GW 2 connection may respond with an APN and additional configuration parameters in the DNS resource record (e.g. in a TXT record) of the response. The UE 1 may process the resource record to construct a request for a new gateway connection. A part of the SRF 8 may be implemented at the UE.

Figure 3:
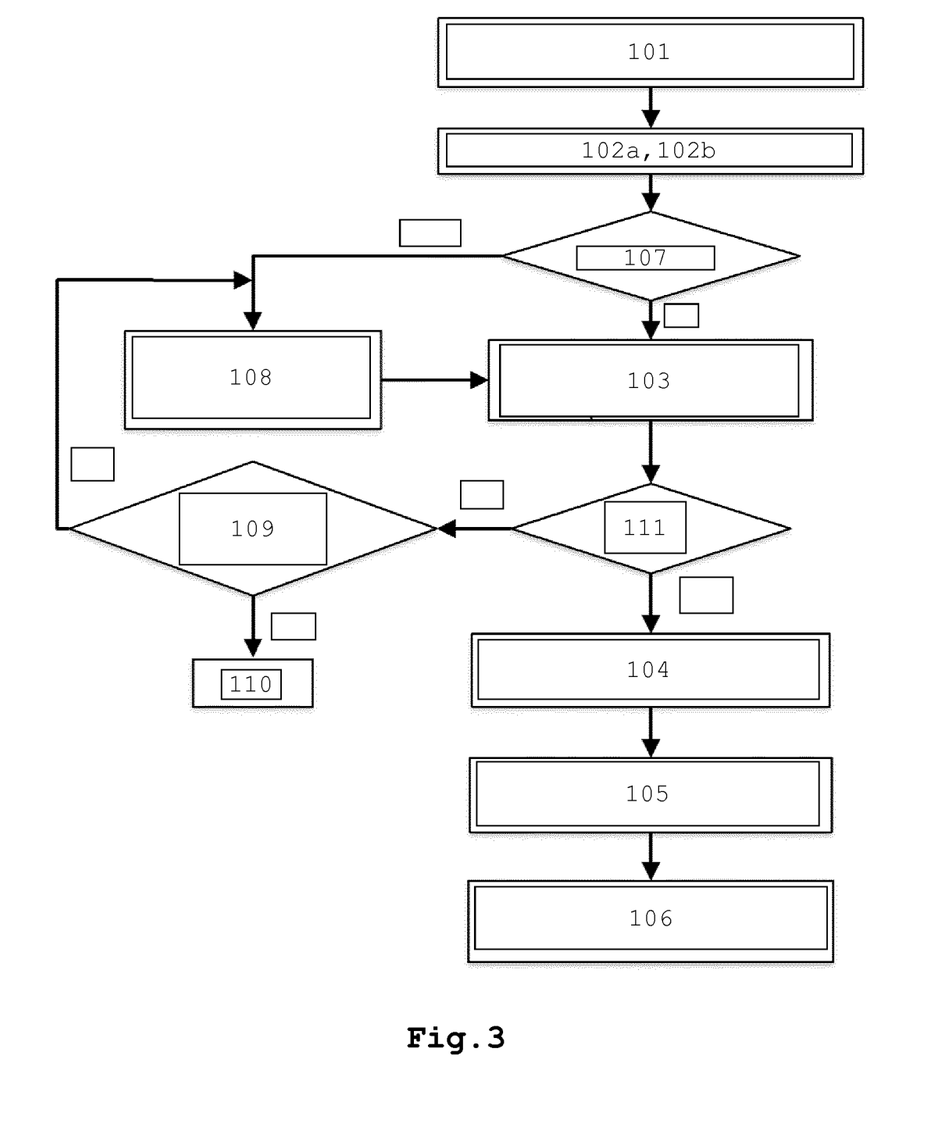
FIG. 3 shows a flow chart of an exemplary embodiment of the invention.

FIG. 3 shows a flow chart of an exemplary embodiment of the invention. The UE 1 makes a service request 101 via the default gateway 2. The SDF 6 intercepts 102a and analyses 102b the service request. If the SPF 9 is to be signaled is optionally determined 107. If the SPF 9 is not used then the SGSF 7 determines 103 the configuration of the gateway 3 to be used for the requested service. If the requested service cannot be found by the SGSF 7, which is optionally determined in step 111, the SPF 9 may be used for provisioning the missing data. If the SPF 9 is not used, then the SRF 8 sends 104 the configuration data for setting up a connection from the UE 1 to the gateway 3. The UE requests and configures 105 the new gateway connection and redirects 106 new requests to the service to the new gateway connection. It may be determined 109 if the service 4,12,13 is to be requested from the service provider. If this is not the case then the process may stop 110. The SPF 9 optionally requests 108 the service provider to load and execute the service 4,12,13.

In the following examples the gateway redirection is DNS based. The operator may make available (e.g. through an application programming interface) to the service provider a number of physical locations (e.g. PDN-GWs within a specific building (with Home eNodeB), specific area, or with a specific coverage) that allows the service provider to choose, allocate, and configure resources in relation to the operator's network, the UE, and possibly other properties, such as resource availability, security, and policies. Alternatively, the operator can manually configure a server from a service provider in its network (e.g. a web server).

Figure 4:
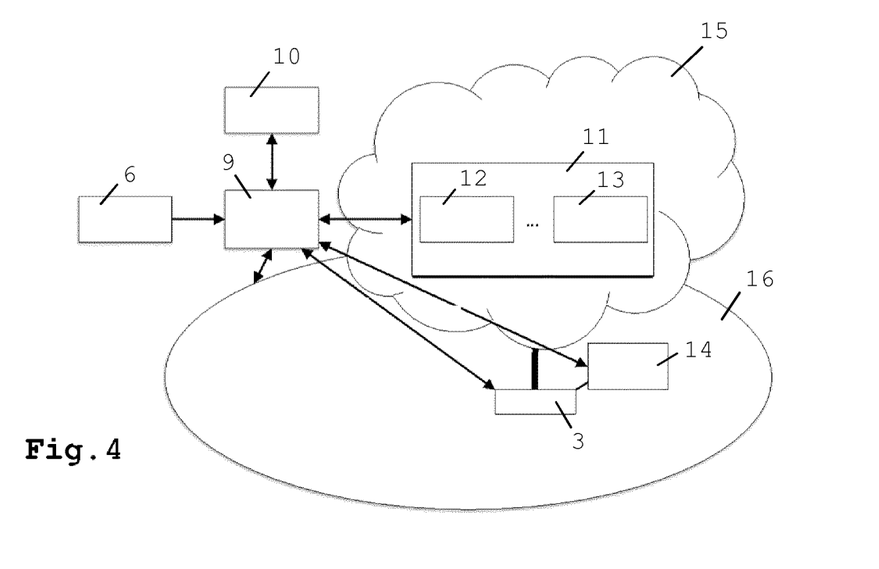
FIG. 4 shows a network architecture of an exemplary embodiment of the invention.

An example of an implementation of an SPF 9 is shown in FIG. 4. On receiving a request from a source 6 (e.g. from a service provider 10, SDF 6, or SGSF 7), the SPF 9 may request the service provider 10 to host a server for the service 12,13 in an external network 15. The operator of the server of the service 12,13 may offer computer resources 11 to the service provider 10 through an application-programming interface. To receive service requests, the network configuration may be updated by transmitting a configuration update request to the network service provider 16. For example, the PDN-GW may need additional routing and filtering rules and the DNS server of a DNS service 14 may need to be updated.

The SDF 6 and SGSF 7 may be implemented as part of the DNS server of the DNS service 14, which may be associated with the default connection (e.g. default PDN-GW 2) of the UE 1. The SDF 6 and SGSF 7 may be implemented by extending a DNS server backend (e.g. open source PowerDNS).

When a UE 1 sends a service request (e.g. HTTP or SIP request), it has to resolve the location (e.g. IP address) of the service. Therefore the service request typically leads to a DNS query to the DNS server of the DNS service 14 set up by the default connection configuration, which is detected by the SDF 6. A request to the SGSF 7 (and optionally the SPF 9) may then be initiated as a result of the UE's DNS query.

From the UE's DNS query (containing at least the name of the service the UE wants to access, and possibly the UE's identity such as its IP address), the SGSF 7 chooses a gateway 3 from the database, which may contain a list of connection configurations associated with specific services, and creates a DNS resource record with the connection configuration appended to the normal query response. An example of such DNS resource record is a RFC1464 compatible DNS record containing e.g. connection configuration as follows.

| | | | | |
|---|---|---|---|---|
| www.kpn.com | 1883 | IN | A | 62.132.193.64 |
| www.kpn.com | | IN | TXT | "APN=office.kpn.com" |

The DNS resource record is returned as response to the UE's DNS query. The UE 1 may use the DNS resource record to determine if it should create a new PDN-GW connection, switch to a Wifi access point, or do nothing. If the UE 1 requests a new PDN-GW or WiFi access point connection, it may use known mechanisms to create and setup the connection using the information from the DNS resource record (e.g. PDN-GW connection request). Once the new gateway connection is set up, the gateway-specific service requests may be sent through the new gateway 3.

Figure 5:
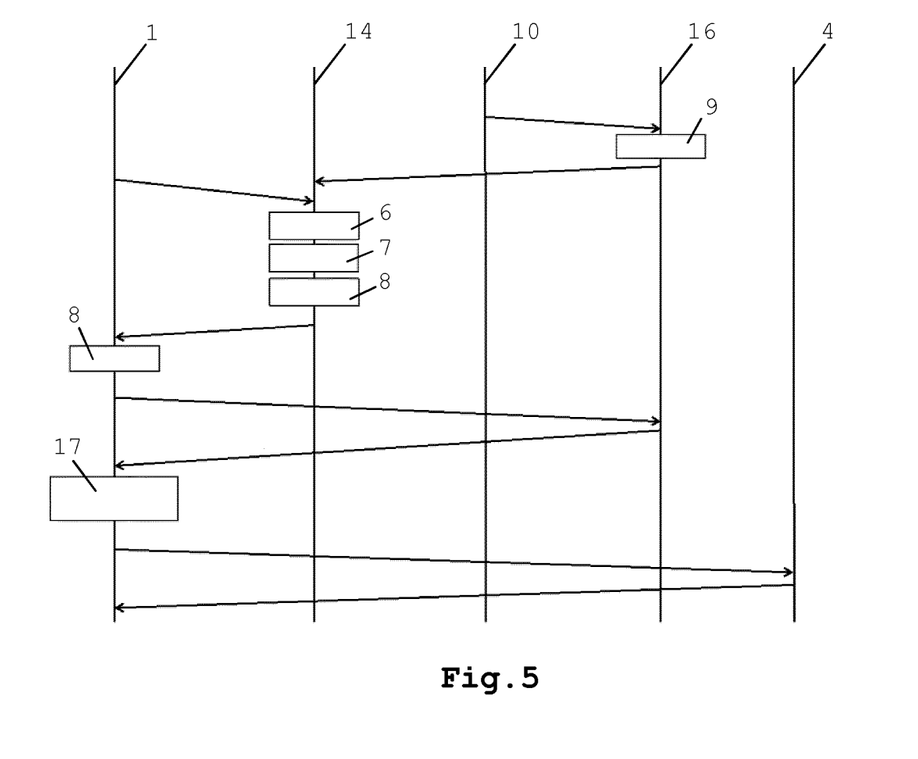
FIG. 5 shows a time-sequence diagram of an exemplary embodiment of the invention.

FIG. 5 shows a time sequence diagram of an exemplary embodiment of the invention. Optionally, e.g. from the service provider 10 a service placement request is transmitted to the SPF 9 at the network service provider 16. The SPF 9 optionally sends an update message containing data for updating the DNS server to the DNS service 14. In this example the SDF 6, SGSF 7 and SRF 8 are located on the same server as the DNS server of the DNS service 14. The client device 1 sends a data signal, in this example a DNS lookup message, to the DNS server of the DNS service 14 via a default PDN-GW 2 to which the client device 1 is connected. The DNS lookup is intercepted by the SDF 6. The SDF 6 analyses the DNS lookup message and the analysis result is used by the SGSF 7 to select an optimal PDN-GW 3. The SRF 8 transmits the configuration data with the reference to the optimal gateway 3 to the client device 1 via the default PDN-GW 2. In this example the configuration data is part of the DNS resource record transmitted to the client device 1 in response to the DNS lookup. The client device 1, possibly using a SRF part 8 in the client device 1, is configured to connect to the optimal gateway 3 and sends a gateway connection request to the network service provider 16 for setting up a connection with the optimal gateway 3. The network service provider 16 responds with a gateway connection response. The client device 1 finalized the gateway connection setup, which is indicated with box 17, after which service requests from the client device 1 to a server of the service 4 and server responses from the server of the service 4 to the client device 1 are transmitted via the optimal PDN-GW 3.

The invention may be used in scenarios wherein gateway redirection spans multiple domains. In that case, SDF 6, SGSF 7, SRF 8, and optionally SPF 9 may need to communicate with network service providers 16. For example, the SDF 6 may detect a service, which may be optimized by creating a gateway connection to a different network. Availability about possible gateways to handle the service requests may be placed in infrastructure DNS (e.g. in RFC1464 compatible DNS records), which is shared amongst network service providers. By using infrastructure DNS to store connection configuration information, the SGSF 7 may make a selection from the possible gateways spanning multiple service provider networks.

Whether IP connectivity for the UE 1 is provided through a PDN-GW or through other access technologies (e.g. WiFi) is irrelevant for the workings of the invention. The functional components may be implemented in for example WiFi similar to what is described for PDN-GWs.

Creating a connection to a Wifi access point 3 from a mobile network connection may be achieved as follows. The SDF 6 detects a service request. The SGSF 7 queries a mobile management entity (MME) for the geographic location of the current cell serving the UE 1. The SGSF 7 determines the Wifi access points that may be in range of the current location of the UE 1 (i.e. the wifi access points are also associated with geographic locations). The SGSF 7 queries the WiFi access points to establish if the MAC address of the UE 1 is registered. If the MAC address is registered at a specific WiFi access point 3 and the signal strength is sufficient, the SGSF 7 returns the SSID of the specific access point 3. The SRF 8 may request the UE 1 to connect to the wifi access point 3.

The SGSF 7 may be used to optimize network properties, such as selecting different paths to route specific services or by providing different quality of service. The SRF 8 in this case may then be used to create a new connection configuration which attaches additional information to service requests (e.g. a token in IP traffic, similar to MLPS or VLANs) or which is used to apply specific network services (e.g. source routing).

One embodiment of the invention may be implemented as a program product for use with a computer system. The program(s) of the program product define functions of the embodiments (including the methods described herein) and can be contained on a variety of non-transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored.

The invention claimed is:

1. A method of redirecting a client device from a first gateway to a second gateway for accessing a network node function remote from the client device, wherein the client device is communicatively connected to the first gateway, wherein the client device is communicatively connectable to the second gateway, wherein the second gateway is communicatively connectable to the network node function, and wherein each of the first gateway and the second gateway is a packet data network gateway in a mobile core network, the method comprising:
intercepting a data signal transmitted from the client device via the first gateway, wherein the data signal comprises data for using the network node function;
analyzing the data for a pattern associated with the network node function to obtain an analysis result comprising an indication of the network node function;
selecting a reference to the second gateway based on the analysis result and generating configuration data comprising the reference wherein selecting is further based on one or more properties of the client device, the one or more properties including at least one of cell location, policies, and subscriber information;
transmitting the configuration data to the client device to configure the client device to initiate a connection to the second gateway and to transmit further data for using the network node function via the second gateway.

2. The method according to claim 1, wherein:
the intercepting and analyzing are performed by a service detection function;
the selecting is performed by a service gateway selection function; and
the transmitting of the configuration data to the client device is performed by a service redirection function, and wherein the service detection function, the service gateway selection function and the service redirection function are computer implemented software functions in a single network node or in one or more physically separated and communicatively connected network nodes.

3. The method according to claim 1, further comprising:
transmitting the analysis result to a service placement function, wherein the service placement function is a computer implemented software function in a first network node of a provider of the network node function; and
enabling access to the network node function based on the analysis result by the service placement function.

4. The method according to claim 3, wherein the enabling of the access comprises transmitting the reference from the service placement function to a service gateway selection function.

5. The method according to claim 3, wherein the enabling of the access comprises loading and/or executing of the network node function on a second network node by the service placement function.

6. The method according to claim 1, wherein:
the reference is an access point name.

7. A computer program product, implemented on a computer-readable non-transitory storage medium, the computer program product configured for a service detection software function, which, when being executed by a processor, is operative for the intercepting and the analyzing in the method according to claim 1.

8. A computer program product, implemented on a computer-readable non-transitory storage medium, the computer program product configured for a service gateway selection software function, which, when being executed by a processor, is operative for the selecting in the method according to claim 1.

9. A computer program product, implemented on a computer-readable non-transitory storage medium, the computer program product configured for a service redirection software function, which, when being executed by a processor, is operative for the transmitting of the configuration data to the client device in the method according to claim 1.

10. A computer program product, implemented on a computer-readable non-transitory storage medium, the computer program product configured for a service placement software function, which, when being executed by a processor, is operative for the enabling of the access to the network node function in the method according to claim 1.

* * * * *